Figure 3:
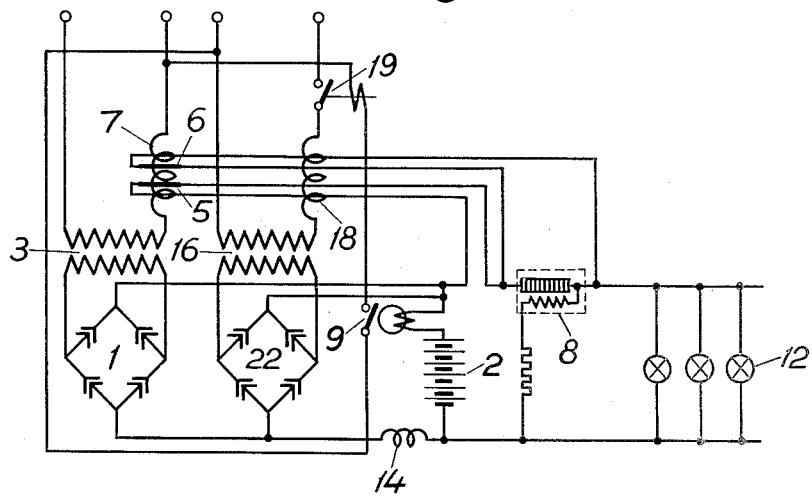
Figure 4:
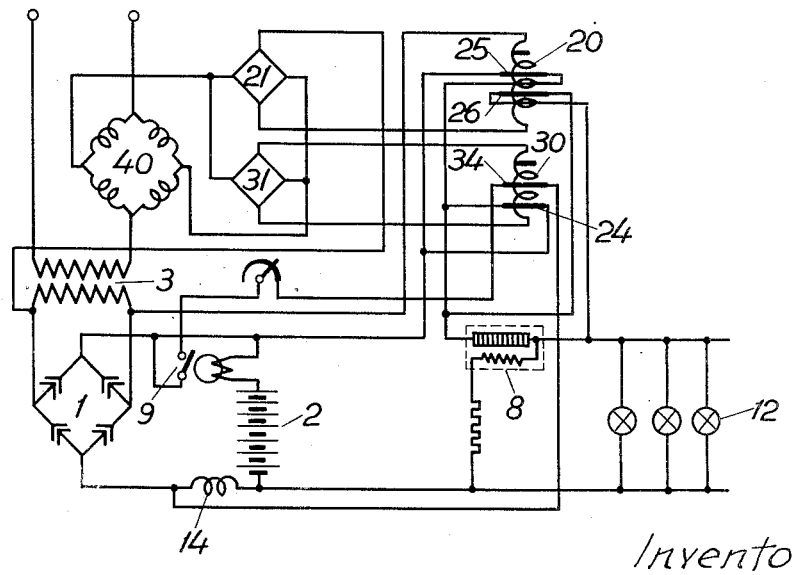

Nov 24, 1953  A. ARVIDSSON  2,660,702
ARRANGEMENT IN TRANSDUCTOR-CONTROLLED RECTIFIER
COOPERATING WITH STORAGE BATTERY AND LOAD
Filed April 20, 1948  2 Sheets-Sheet 1
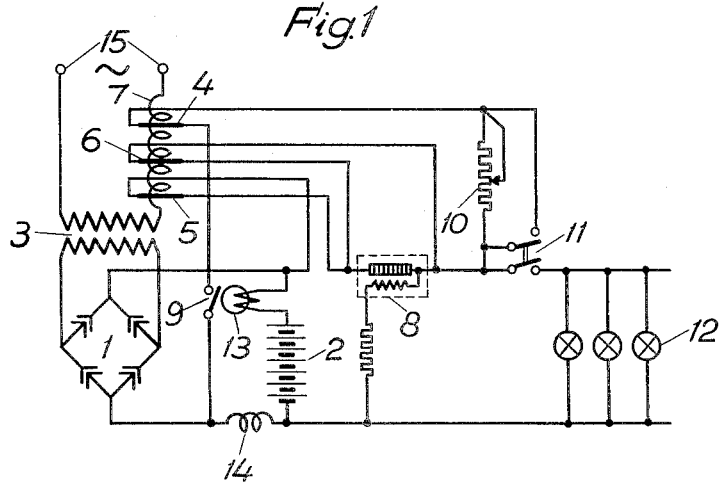
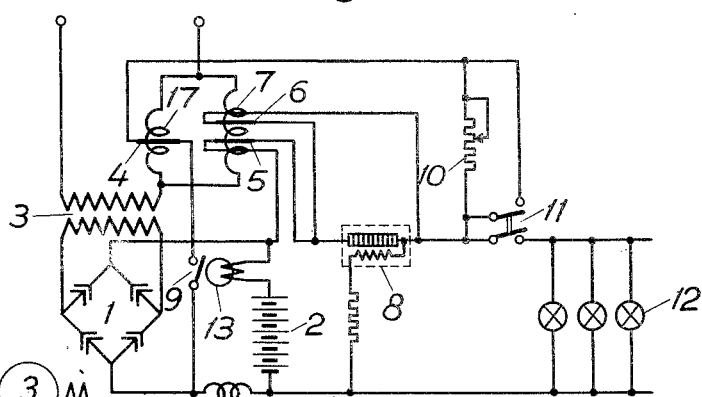
Inventor
Algot Arvidsson
By [signature]
Attorney.

Inventor
Algot Arvidsson
By [signature]
Attorney

Patented Nov. 24, 1953

2,660,702

UNITED STATES PATENT OFFICE 2,660,702

ARRANGEMENT IN TRANSDUCTOR-CONTROLLED RECTIFIER COOPERATING WITH STORAGE BATTERY AND LOAD

Algot Arvidsson, Ludvika, Sweden, assignor to Allmanna Svenska Elektriska Aktiebolaget, Vasteras, Sweden, a Swedish corporation Application April 20, 1948, Serial No. 22,086

11 Claims. (Cl. 320—10)

For certain purposes, for instance for train lighting, it is advisable to employ transductor-controlled rectifiers fed from an alternating current line or from separate alternating current generators in cooperation with storage batteries, which are alternately charged and discharged. In such connections it is known to cause the control transductor for the rectifier to be direct current saturated by an ampereturn number, which essentially corresponds to the current of the consumer. According to the present invention, a control transductor for a rectifier connected to the battery is also magnetized by a current, which does not rise with the load current, in order to deliver a corresponding charging current to the battery. It is possible to use one single rectifier and in some cases also a common control transductor for both functions, but it is often advisable to employ separate rectifiers or at least separate control transductors for the load current component and for the charging current component.

In the accompanying drawing, Figs. 1-5 show diagrams of connections for four different forms of the invention.

In Fig. 1, the numeral 1 designates a dry rectifier and 2 a battery. The rectifier is fed from a pair of alternating current terminals 15 through a transductor 7 and a transformer 3. The rectifier and the battery are connected in parallel to a load 12 shown as a number of electric lamps. The voltage across the load is kept substantially constant by means of a carbon column regulator 8, and the current from the rectifier is smoothed by means of a reactor 14.

The transductor 7 has three conventionally indicated direct current windings 4, 5, 6, the winding 5 being traversed by the load current and serving to control the transductor current so that the output current of the rectifier will always include one current component, which is substantially equal to the load current. In order to make the rectifier deliver in addition to the said current a substantially constant charging current component to the battery, the winding 4, which acts in the same sense as the winding 5, is fed by a substantially constant number of ampereturns, which may be regulated by hand, the winding 4 being connected to the load voltage through a resistance 10 regulable by hand. The amount of excess charging current to be produced by winding 4 can be regulated by adjusting resistance 10. The load voltage is kept constant by the regulator 8. The third winding 6 serves to reduce the charging current, when the battery begins to be fully charged. For this purpose it opposes the two other windings and is connected in parallel to the carbon column regulator 8, which absorbs an increasing voltage, as the voltage of the battery rises, showing that it begins to be fully charged. Hereby the current delivered by the rectifier is reduced in a corresponding way.

The battery may also be provided with an ampere-hourmeter or so-called sangamometer 13 for indicating its state of charge. When this meter shows the battery to be fully charged it may break a contact 9 in the circuit through the winding 4. Winding 5 enables the rectifier to supply the load current, while the battery floats on the line, and winding 4 controls the rectifier to supply a constant charging current to the battery, so long as winding 4 is effective, that is, until the circuit of winding 4 is interrupted by the sangamometer 13.

The load may be disconnected by a circuit breaker 11, which preferably may have an auxiliary contact, which short-circuits the resistance 10, when the load is disconnected. Hereby the charging current of the battery is increased, so that the periods of no load are efficiently utilized for charging the battery.

In Fig. 2, the parts 1—3 and 8—14 correspond to the parts designated by the same numerals in Fig. 1. 1 thus designates a rectifier, 2 the battery, 3 a transformer, 12 a lamp load, 8 a lamp voltage regulator, 13 a charge-meter (for instance a so-called sangamometer), 9 a contact actuated by the latter, 14 a smoothing reactor, 11 a load circuit breaker with auxiliary contact and 10 an adjustable resistance. Instead of a single transductor for controlling the rectifier 1, two parallel-connected transductors 7, 17 are used in this case, the transductor 7 having two direct current windings 5, 6 and the transductor 17 one direct current winding 4. These windings are connected and function in the same manner as the corresponding windings in Fig. 1, i. e. the winding 5 is traversed by the load current, the winding 6 opposing the former is fed from the voltage across the resistance of the lamp regulator 8, and the winding 4 of the transductor 17 is fed from a constant voltage through the adjustable resistance 10. This resistance may, as in Fig. 1, be short-circuited by an auxiliary contact of the circuit breaker 11, when the load is disconnected, and on the other hand, the whole circuit through the winding 4 may be interrupted by the contact 9 under the influence of the sangamometer 13, when the battery is fully charged. Since the rectifier 1 here is common to the two transductors, also the transformer 3 may be common.

In Fig. 3, separate rectifiers 1, 22 are employed for delivering the load current and for delivering essentially the charging current to the battery 2. In addition hereto the simplification is introduced—which is substantially independent of the aforesaid modification—that the rectifier furnishing the charging current is controlled by a simple reactor 18 instead of by a transductor. In this case, two separate transformers 3, 16 connected to the same alternating current source are required for the two rectifiers, if the transductor 7 and the reactor 18 are connected on the primary side as shown. The possibility of regulating the charging current of the battery 2 in a simple manner then disappears, and the interruption of the charging is preferably effected by interrupting the whole circuit through the reactor 18 by means of a contactor 19, which is directly or indirectly controlled by the sangamometer contact 9. The transductor 7 has two direct current windings 5, 6, which are connected in the same way as the corresponding windings in Fig. 2.

In Fig. 4, there is again employed a common rectifier 1 with a transformer 3 but two separate transductors for controlling the rectifier. These two transductors, however, in Fig. 4 constitute only auxiliary transductors, which operate a common main transductor. The auxiliary transductors, which are of the type with a so-called internal self-magnetisation, are designated by 20 and 30 and the main transductor by 40. The transductor 20 has a direct current winding 25, which is traversed by the load current, and a winding 26 opposing the former and actuated by the voltage across the resistance of the lamp voltage regulator 8. Further it has a self-magnetisation indicated in a conventional manner. The transductor 30 has only one direct current winding effecting a magnetisation independent of the load variations but regulable by hand and further a self-magnetisation. The main transductor 40, which is fed through rectifiers 21, 31, is of the type in which the same windings are traversed by both direct and alternating current. This makes it possible to feed in the direct current without interfering with the flow of alternating current to transformer 3. On the other hand, the transductor 40 is not self-magnetized, as it should deliver a current essentially proportional to the influencing direct current ampereturns. The parts 1—3, 8—15 correspond essentially to those of Fig. 1. Both transductors 20 and 30 are here connected to the alternating current voltage on the low voltage side of the transformer.

If in some of the ways described the charging current to the battery is derived from a separate transductor, the latter may be influenced by a counter-magnetizing component, which essentially corresponds to the load current, whereby the charging current is somewhat reduced when the load is increased, and the total rectifier current is thus kept substantially constant. Such a component is in Fig. 4 created by the winding 24, which is connected in parallel to the winding but represents a smaller number of ampereturns than the latter. A similar result can be obtained in a connection according to Fig. 1 by such a dimensioning of the transductor that the current component of the rectifier dependent on the load current will be somewhat smaller than the load current itself.

If, as shown in Fig. 5, the rectifier is fed from a separate alternating current generator 3, which in train lighting systems may be driven from the axle of the carriage, it may in some cases be advisable to connect the transductor 7 in series with the exciting winding of the said generator through a rectifier 36.

I claim as my invention:

1. Means for feeding an electric current comprising a load, a storage battery connected to feed said load, a source of alternating current, rectifier means, means connecting said rectifier means to said source, transductor means in said connecting means, said rectifier means being connected to said load so as to cooperate with said battery to feed the load, means to feed to a saturating winding of said transductor means a current component substantially proportional to the current absorbed by said load, said transductor means and said feeding means being so proportioned that a current substantially equal to the current absorbed by the load is fed to said rectifier means from said source in response to such current component, and means to feed to said rectifier means a second current component which acts in the same sense as said first current component and which does not increase with increases in the current absorbed by said load.

2. In means as claimed in claim 1, means to increase said second component with decreases in the current absorbed by said load.

3. In means as claimed in claim 1, means to feed to a winding of said transductor means a third current component which opposes said first component and which increases as the charge of the battery increases.

4. Means for feeding an electric current comprising a load, a storage battery connected to feed said load, a source of alternating current, rectifier means, means connecting said rectifier means to said source, transductor means in said connecting means, said rectifier means being connected to said load so as to cooperate with said battery to feed the load, means to feed to a saturating winding of said transductor means a current component substantially proportional to the current absorbed by said load, and means to saturate said winding by a current component which acts in the same sense as said first current component and which does not rise with the increase in the current absorbed by the load, and switch-controlled means to increase the effect of said saturating means when said load is disconnected.

5. Means for feeding an electric current comprising a load, a storage battery connected to feed said load, a source of alternating current, rectifier means, means connecting said rectifier means to said source, transductor means in said connecting means, said rectifier means being connected to said load so as to cooperate with said battery to feed the load, means to feed to a saturating winding of said transductor means a current component substantially proportional to the current absorbed by said load, said transductor means and said feeding means being so proportioned that a current substantially equal to the current absorbed by the load is fed to said rectifier means from said source in response to such current component, and means to feed to a saturating winding of said transductor means a second current component which does not increase with increases in the current absorbed by said load and which acts in the same sense as said first component.

6. In means as claimed in claim 5, said second component being constant.

7. In means as claimed in claim 5, means to feed to a saturating winding of said transductor means a third current component which opposes said first two components and which increases as the charge of the battery increases.

8. In a device as claimed in claim 1, said transductor means including a simple reactor, said rectifier means including a rectifier connected in series with said reactor, said rectifier being connected to said battery to charge the same.

9. In a device as claimed in claim 1, said transductor means including two transductors connected in parallel with respect to said connecting means, said first feeding means feeding a saturating winding of one of said transductors with said current component substantially proportional to the current absorbed by said load, said second feeding means feeding a saturating winding of the other transductor with said second current component.

10. In a device as claimed in claim 1, said transductor means including a main transductor and auxiliary transductors, said rectifier means including rectifiers connected to each of said auxiliary transductors respectively and to windings of said main transductor, said first feeding means feeding a saturating winding of one of said auxiliary transductors with said current component substantially proportional to the current absorbed by said load, said second feeding means feeding a saturating winding of the other of said auxiliary transductors with said second current component.

11. In a device as claimed in claim 1, said alternating current source comprising a generator, said rectifying means including a rectifier connected to the exciting winding of the generator, said connecting means also including means connecting said rectifier to said source, said transductor means being in said last connecting means.

ALGOT ARVIDSSON.

References Cited in the file of this patent

UNITED STATES PATENTS

| Number | Name | Date |
|---|---|---|
| 760,714 | Turbayne | May 24, 1904 |
| 838,822 | Thomson | Dec. 18, 1906 |
| 1,916,307 | Gilson | July 4, 1933 |
| 1,995,637 | Day | Mar. 26, 1935 |
| 2,029,628 | Lord | Feb. 4, 1936 |
| 2,082,607 | Amsden | June 1, 1937 |
| 2,139,330 | Gilson | Dec. 6, 1938 |
| 2,179,299 | Murcek | Nov. 7, 1939 |
| 2,235,330 | Pugh | Mar. 18, 1941 |
| 2,316,331 | Hedding | Apr. 13, 1943 |
| 2,373,383 | Christopher | Apr. 10, 1945 |
| 2,431,311 | Cronvall | Nov. 25, 1947 |
| 2,431,312 | Cronvall | Nov. 25, 1947 |